INTERCOMMUNICATION SYSTEM
Filed Oct. 16, 1963
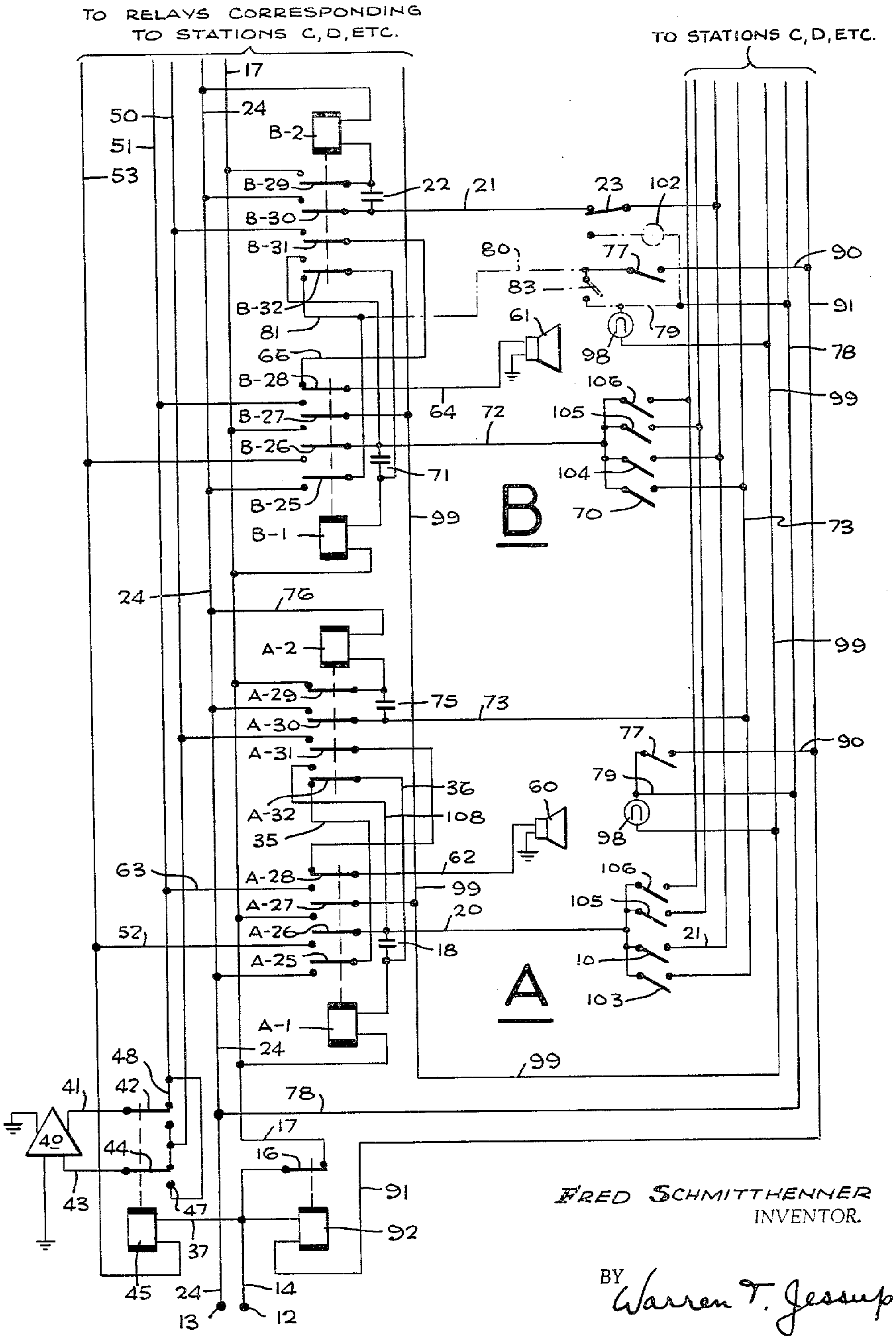
FRED SCHMITTHENNER
INVENTOR.
BY Warren T. Jessup
ATTORNEY United States Patent Office 3,219,761 Patented Nov. 23, 1965

3,219,761

INTERCOMMUNICATION SYSTEM

Fred Schmitthenner, 6750 Selma Ave., Los Angeles, Calif.

Filed Oct. 16, 1963, Ser. No. 316,592
7 Claims. (Cl. 179—40)

The present invention relates to intercommunication systems of the loud speaking type, and relates in particular to the type of system wherein only one direction of voice transmission proceeds at one time, and wherein both directions of communications are manually controlled by a switch mechanism operated at the calling station. This application is a continuation-in-part of copending application Serial No. 146,293, filed October 19, 1961, and is a continuation of prior application Serial No. 172,230, filed February 9, 1962, and now abandoned bearing the title Circuit for Intercommunication Systems.

Intercommunication systems are traditionally bulky and complicated in operation. It is an object of the present invention to minimize the physical size of stations and provide simplified operations at a lower cost.

Common to the prior art systems is the use of manually operated, multiple contact selector switches, or separate single contact selector keys operated in conjunction with multiple contact switches, for the closing of a single two-way communication circuit.

It is a further object of the present invention to reduce the number of manually operated controls necessary for operation of a two-way communication circuit to one single contact switch.

Further examples of requirements in the prior art which are overcome by this invention are: the requirement of individual amplification at each station; separate power supplies at each station; the individual connection of stations to a 117-volt power line; time consuming staggered wiring for installation; and, the excessive cost of equipment.

It is a still further object of this invention to provide an intercommunication system employing a single amplifier and power supply unit at a central location, and to incorporate in this unit all the switching mechanism essential to the operation of an intercommunication system which need not be placed at the station itself.

It is a general object of this invention to provide a new circuitry which substantially reduces the size and cost of intercommunication stations and ameliorates these defects.

More specifically, it is an object of this invention to provide at all stations a single contact, normally open switch, which when closed, will establish a two-way communication with another station. This circuit may be employed in master-to-master, or master-to-remote station operation, or selective communication with one or several stations, or for conference communication between a number of stations.

In accordance with these and other objects which will become apparent hereinafter, a preferred form of the present invention is disclosed in the accompanying drawing.

The single figure of the drawing illustrates the circuit of a commercially tested system embodying the features of this invention.

As viewed on the page of the drawing, the circuitry and the equipment illustrated to the left of the center line of the drawing may be placed at a convenient central location, and only the essential equipment, consisting mainly of the transducer and station switches, together with indicating lights and other similar miscellaneous equipment, is needed at the individual station. The centrally located equipment comprises generally the source of power, the audio amplifier and switching relay devices, and necessary collateral equipment. The circuit and equipment located on the drawing to the right of the central line illustrates two intercommunicaton stations A, and B, comprising the transducers, a number of single contact switches, a pilot light at each station, and interconnecting leads extending to other stations, such for example as suggested stations C and D.

*Station A calls station B*

The drawing illustrates all equipment at "standby." In order to give an example of the invention, an operating sequence wil be used. Hence, if station A is to initiate a communication with station B, normally open switch 10 is closed at station A.

A source of power is needed to drive the transducers and relays, and may be any suitable source of power commonly used for such purposes. Hence, the power source is simply indicated by two unconnected power terminals 12 and 13. This is strictly for convenience of description, and it is to be understood that the power may be from any source, as those skilled in the communication art will understand.

Closing of switch 10 closes a circuit which may be traced: terminal 12, lead 14, a normally closed contact 16, trunk line 17, the power coil of relay A–1, condenser 18, connecting wire 20, the switch 10, and interstation connecting wire 21, normally closed switch 23, condenser 22 associated with station B, coil of a relay B–2, and trunk line 24 which is a lead back to the terminal 13.

In the embodiment of the invention illustrated in the drawing, the power from terminals 12 and 13 is direct current. Hence, upon closing switch 10 at station A, the condensers 18 and 22 are charged and a surge of power is drawn through the coil of relays A–1 and B–2, causing these relays to operate, each closing a number of contacts associated therewith.

Each of the stations employs a primary and a secondary relay. These relays are designated in the drawing by using the numeral corresponding to the station, followed by the number 1 or 2, representing the primary and secondary relays. Hence relays A–1 and A–2, correspond to station A, whereas station B has relays B–1 and B–2. Because the requirement of all stations are substantially the same, these relays are standard for each station. Hence, the contacts which are operated by each of the relays are numbered with the station letter followed by the numerals 25 through 28, with respect to the primary relay, and contacts 29 through 32 for the secondary relay. As a specific example, the primary relay for station A is designated A–1, and this relay A–1 operates four contacts A–25, A–26, A–27, and A–28. Relay A–2 carries the contacts A–29, A–30, A–31, and A–32. Likewise, primary relay B–1 and secondary relay B–2 carry like-numbered contacts, as shown on the drawing.

The closing of contact A–25, connects the power terminal 13 through lead 24, contact A–25, lead 35, contact A–32, lead 36, to the coil of relay A–1, causing relay A–1 to remain energized and to hold all of its contacts closed beyond the period of time that the charging of condenser 18 can operate this relay. Contact B–29 on relay B–2 is closed by drawing the surge of power to the condenser 22 and thereby connects the line 14, contact 16, trunk 17, the contact B–29, to the coil of relay B–2 causing this relay to be held in energized condition after the surge of power ceasing which was caused by charging the condenser 22.

The illustrated system employs a conventional amplifier 40 having an output lead 41 extended to a contact 42. The input to amplifier 40 is indicated by reference character 43, and this input is extended to a contact 44.

One aspect of this invention resides in the concept of switching the circuitry to reverse the station connections. For example, the connected stations may first represent a microphone-to-speaker condition, and then reverse to a condition of a speaker receiving from a microphone. This is accomplished by causing the contacts 42 and 44 to shift under certain circumstances.

The power device to cause such reversal is a relay 45. The contact 44 rests in contact with trunk line 50. When the relay 45 is operated, the contact 44 is pulled into contact with a pole 47 of a trunk line 51. Switch 42 is normally in contact with trunk line 51 and when the relay 45 is operated, is drawn into contact with the trunk line 50. Thus, it will be seen that operation of the relay 45 will reverse the input and output of the amplifier 40 with respect to the lines 50 and 51. When in the condition illustrated in the drawing, line 50 is connected to input and line 51 receives the output. When the relay 45 is actuated, line 51 is connected to input and line 50 to the output.

After energization of the relay A–1, the switch 10 becomes connected into a new circuit performing a new function. Note that the interconnecting wire 20 is connected to the contact A–26, as well as to the condenser 18. After the condenser 18 is fully saturated it acts as a disconnected device in the line to the function of its base and therefore current through connecting wire 20 may act through the contact A–26 without effecting the holding action of the relay.

Thus, as the switch 10 is operated after closing of relay A–1, the switch 10 will complete a circuit for the relay 45 which may be traced from terminal 12, lead 37, through relay 45, trunk line 53, line 52, contact A–26, connecting wire 20, switch 10 and interstation connecting wire 21 to contact B–30 at the secondary relay B–2 of station B and back to terminal 13.

As thus far described, therefore, when a calling party at station A closes switch 10, the first function is to actuate and hold the relay A–1, and upon carrying forth this function the contact A–26 becomes closed and the switch 10 thereafter serves as a means to control the position of relay 45. With the switch 10 open as shown in the drawing, the contacts 42 and 44 hold the position shown in the drawing. Upon closing switch 10 the relay 45 operates to change the output and input of the amplifier 40 by shifting the contacts 42 and 44 as previously described.

Each station has a transducer capable of serving either as a microphone or a loud speaking unit according to the manner in which it is connected to the amplifier 40. At station A the transducer is indicated by reference number 60, and at station B by the reference number 61. The transducer at station A is connected by means of wire 62, through the contact A–28 which is closed by operation of the relay A–1, to a wire 63 and then to the trunk line 51. Hence, after operation of the relay A–1, the transducer 60 is connected through contact 42 to the output 41 of the amplifier 40. The circuit for the transducer 60 is completed by extending a line to ground. Then, if the switch 10, which originated the entire sequence, is held in contact, the relay A–1 is first locked into continuous operation, and then the switch ceases to act as an initiating switch, and serves the function of establishing control over the relay 45, as described. Therefore, the switch 10 is in control of the mode of operation of the transducer 60. That is, whether it will serve as a microphone or a speaker. If the switch 10 is held closed, it will hold the contacts 42 and 44 in the condition opposite that shown in the drawing, and transducer 60 is conditioned to be a microphone. At station B, the transducer 61 is connected by means of a wire 64 through a normally closed contact B–28 and wire 66, to the contact B–31 and hence to the trunk wire 50.

When relay 45 is actuated by switch 10 to place transducer 60 into the condition of a microphone, this same operation will connect the output 41 to line 50, and therefore connect the transducer 61 as a loud speaking unit. Under such circumstances, the station A is conditioned to transmit the voice of the operator and that voice will be heard through the unit 61. The operator at station A then may release the switch 10, thus, returning the relay 45 to the condition illustrated in the drawing, and both the units 60 and 61 will be reversed in their operating condition. That is, a person at station B may then speak and be heard through the unit 60. Thus, the person at station A is in control of a two-way communication and will determine when the transducers will serve as microphones and when they will serve as loud speaking units. Thus, the person at station B must wait until his station is transformed into a microphone station before he can reply to any communication from another station.

To assure clarity of understanding of this invention, the reverse situation wherein station B calls station A will be illustrated. Note that the prior discussion involved the relay A–1 at station A but involved the secondary relay B–2 at station B. The secondary relay of the calling station is not involved, as thus far described, and the primary relay at the called station is not involved under the described circumstances.

If a person at station B desires to call station A, then switch 70 at station B is operated. The closing of this switch 70 closes a circuit which may be traced from the terminal 12 through lead 14, contact 16, trunk line 17, the coil of relay B–1, a condenser 71, connecting wire 72, switch 70 at station B, interstation connecting wire 73, a condenser 75, then through the coil of relay A–2, lead 76, trunk line 24, and back to the terminal 13 to complete the circuit. Note, therefore, that whenever station B becomes the initiating station, rather than the receiving station as previously described, the opposite relay is actuated. This is the primary relay for that station. Likewise, the relay A–2, the secondary relay of station A, is actuated.

Whenever the described circuitry is established by closing the switch 70, the condensers 71 and 75 are employed to close the respective relays B–1 and A–2, in the manner previously described with respect to the relays A–1 and B–2. Thereafter the description previously given may be applied to the equipment and circuitry to establish communication from station B to station A, or any other station in the series.

*Reset*

As the equipment has thus far been described, after a station, for example station A, calls another station, the primary relay of the calling station and the secondary relay of the station that was called, will remain closed and held by the sef-energizing circuits. This situation will prevail until something takes place to break the circuit holding the particular relays.

One means of deactivating the primary relay is to have another station call that station. Thus, if station B should initiate a call to station A, while station A remains in the activated condition having called station B, then the activation of the relay A–2 will operate the contact A–32, thus breaking the circuit of the hold contact A–26. Thus, this circuit is broken and the relay A–1 is de-energized. With such de-energization, of course, all of the relay contacts carried by the relay A–1 will open and disconnect all previously established circuits. Thus, if no other event has taken pace to de-energize the relay A–1, a call received from another station will do so.

However, it is desirable that after a conversation has taken place, all of the equipment be returned to a standby condition in order that power will not be drawn, and so that conversation in the vicinity of the station originally called will not continue thereafter to be transmitted to the calling station. Therefore, at each station there is a reset switch 77. The object of this switch is that when it is closed momentarily, the power to all relays in the system will be interrupted to return everything to a standby situation. The breaking of these hold circuits is accomplished by circuitry and components which receive power from the terminal 13, through a short span of line 24 to connecting wire 78. From the wire 78, short tap wires 79 lead into each of the stations to supply the reset switches 77. From the switch 77, a connecting wire 90 provides a return to a reset line 91 which serves all of the stations. The reset line 91 in turn, leads to the coil of a relay 92, and thence back to the opposite side of the power source, namely the terminal 12.

The relay 92 carries the normally closed contact 16, which is located in the circuit including lines 14 and 17. Hence, momentary opening of the normally closed contact 16 will interrupt power through the line 17 which supplies power to both the primary and secondary relays of all of the various stations. Thus, when the switch 77 is closed to operate the relay 92, everything in the system is de-energized and the system returns to the standby situation as illustrated in the drawing.

Thus, any station in the system will be able to cancel any conversation in progress at any time by pressing the reset switch 77 as well as being able to re-establish a neutral situation after a conversation has been completed. Thus, if there is an emergency need to stop a conversation in progress and initiate a priority call to a particular station, operation of switch 77 will enable such interruption.

It may be that the ability of any station to interrupt by use of the reset switch 77 may not be desired. Thus, there is an alternative arrangement which will enable any one, or all, stations to be limited to cancellation of the system only if that station originated the call. This alternative arrangement is illustrated in phantom in the drawing at station B only. Thus, according to the drawing, if this alternate arrangement is employed, station B will be limited and will be unable to reset the entire system except when station B is the originating calling station. To provide this feature, a switch 83 is used to break connection between switch 77 and line 79. Then, a line 80 is shown as a broken line extending from the switch 77 to the line 81 which interconnects the contact B–25 and B–32, which line 81 is connected to the power line only when the relay B–1 is active. Thus, there is power available to the switch 77 only when station B originates a call, thus activating its primary relay B–1. In order that the switch 77 be capable of activating the relay 92, there must be available a source of power. Thus, when using the alternate arrangement thus described, station B is capable of supplying power, and thus cancelling the power to the various relays, only when the station B is the originating station.

*Signal lights*

It is desirable to know whether the system is in use before attempting to originate a call. One such means is shown on the drawing, and may be modified to a more specific system.

At station A, contact A–27 interconnects trunk line 17 to a signal light 98 through a wire 99. The signal current is returned through the wires 79 and 78 back to the trunk line 24.

The line 99 is a trunk line which connects each of the contacts similar to the contact A–27, in the primary relays, to lead lines from pilot lights 98, located at each station similar to the description given above with respect to station A. Accordingly, whenever any primary relay is in operation, the pilot lights 98 at all stations will be energized, thus indicating the system is in service.

If, rather than to indicate only that the system is in service, it is desired to indicate what station is originating a call then the circuit is extended from each contact similar to contact A–27 to an individual light at each station representing the station of the corresponding pilot light contact. Thus, for example, the contact A–27 would have a direct circuit to each one of the several stations and there be connected to the pilot light representing station A. Thus, each time the primary relay of a station becomes operative, each pilot light at each of the other stations will be energized.

Another variance is illustrated in station B. It is possible that one or more stations might desire that its transducer may not become a microphone by the control of another station and thus be overheard. Furthermore, during conference, it may be desirable that a transducer be prevented from interrupting. If such variance is desired, opening of switch 23 will cause relay B–2 to remain inactive although a call from another station is placed to station B.

Thus, station B remains private with its transducer electrically disconnected. Also, because the line 21 is now open, the originating station does not become operative when the switch corresponding to station B is closed. Hence, the nonfunctioning pilot light system will indicate to the calling station that the station being called is on private connection.

Furthermore, the switch 23 may be modified by use of a two-pole switch and whenever the line 21 is opened, an audible device 102 is connected in series between line 21 and line leading to 78. Thus, if station A for example were to call station B, the transducers would remain inactive, but an audible signal would be heard at station B.

In the circuitry as described, if communication is desired from one station to several other stations simultaneously, the originating station operator presses the corresponding switches momentarily, but holds one while talking. Thus, the secondary relays of several stations are activated, and the originating station transducer becomes a microphone. All the selected stations will hear the spoken voice at station A.

*Conference*

It has been explained how this invention may be employed to carry on a two-way conversation between two stations, or that several stations may hear while one station announces. Under such circumstances, station A might speak, for example, and all selected stations would hear. All stations could answer but only station A would hear.

The system of this invention may be employed to permit conference calls wherein any station may speak to all of the other stations.

To employ this invention as a conference arrangement, the originator of the conference momentarily presses the switches at his station corresponding to the desired stations to be included in the conference, including the switch corresponding to his own station. To identify the four illustrative switches, the balance of the switches not previously referred to are the switch 103 at station A which is the local station switch. If the conference circuit were not desired in this invention, contact 103 would not be necessary. The switch 104 at station B is the local switch for that station. At station A there are two other switches, namely the switch 105 and 106 corresponding respectively to stations C and D which are employed for illustration purposes, although the detail of these stations are not shown on the drawing. These two switches corresponding to stations C and D are numbered by the same reference numbers 105 and 106 at the station B. Whenever the operator of station A presses momentarily his own station switch 103 and switch 10, 105, and 106, he sets up circuits which energize the secondary relays of all selected stations including his own. The secondary relay of the local station is operated by switch 103 through the interconnecting line 73 and condenser 75. This has been traced with respect to station B, through operating switch 70 at that station. Simultaneously with the energizing of each secondary relay, by momentarily closing the corresponding switch at station A, the primary relay A–1 of station A will be energized. However, with relay A–2 of station A now energized and its contact A–32 shifted to the opposite position, the hold circuit for relay A–1 is broken. Hence, the relay A–1 will not remain operative. It will close only as long as the switch is held closed, and then fall off.

Thus the transducers of the selected stations B, C, and D, and the transducer of the selecting station A are connected through the corresponding contacts on all secondary relays and trunk line 50 to the input of the amplifier. Then, when the operator at station A desires to talk to the other stations, he presses any one of the switches at his own station. This will cause current to flow through line 20, and lead 108 to contact A–32 on the secondary relay, then through line 36, and finally the coil of primary relay A–1. Thus, the primary relay will be supplied with power, but not through its own holding circuit. However, so long as it is supplied with power, all of its contacts will be closed and hence current will be drawn through contact A–26, which will thereby complete the circuit through the relay 45 and reverse the contacts of the amplifier. Thus, the transducer 60 will be connected to the line 51 because its primary relay is now operative, and the line 51 will be connected to the input of the amplifier. All of the other stations in the conference, however, will remain with only the secondary relays operative, and hence all secondary relays will connect the transducers of those stations to the line 50. Line 50 will connect to the output of the amplifier and hence will hear the spoken message at station A through the microphone functioning transducer 60. Therefore, the person at station A speaks until finished and all hear. Upon release of his switch at station A, the transducers of all stations return to the standby condition thus being reconnected through trunk line 50 to the input of the amplifier. Then, another station may activate any of the switches corresponding to the conference group which activation will retain the transducer of the caller in a microphone condition whereas the transducers of all other stations become loudspeakers. Hence, any one in the conference group may speak and all may hear.

Not shown in the drawing are supplementary devices such as volume control for the adjustment of input and output volume in conference setups, dampening devices for elimination of "boom," and other similar equipment.

While the instant invention has been shown and described herein in what is conceived to be the most practical and preferred embodiments, it is recognized that departures may be made therefrom within the scope of the invention which is therefore not to be limited to the details disclosed herein but is to be afforded the full scope of the claims.

What is claimed is:

1. An intercommunication system comprising:

a source of power;

a plurality of stations each station having associated therewith: a primary and secondary relay, each relay having a plurality of contacts, a transducer, one switch representative of each station in the system including the station where located; and, a condenser;

a series circuit from each station to every other station to provide the one station as a calling station and the other as a station being called, said circuit including: the switch representative of the other station; the primary relay of the station calling and the condenser associated therewith; the secondary relay of the station being called and the condenser associated therewith;

said relays in series being activated by connecting said condensers to power through the switch in the circuit, and said relays having a holding circuit through one of its own contacts, whereby the relays hold after the condensers are charged;

an amplifier system having input connections and output connections, each said transducer normally connected to said output through circuit means connected by a contact of the primary relay, and to input through the secondary relay;

a reversing relay adapted to reverse the said input and output of said amplifier system upon activation; and a branch circuit from the series circuit through one of said primary relay contacts connecting the primary relay to said reversing relay, and another branch circuit through a contact of the secondary relay to a power source, whereby, after said condensers are charged the series circuit between the condensers is effectively isolated, and a power supply circuit is established through said switch to reverse the said amplifier by closing said switch.

2. In the intercommunication system defined in claim 1, the switch at each station representing that station providing for conference interconnection of a plurality of stations by activating the secondary relay of that station; and a by-pass connection means for activating said primary relay thereby connecting the transducer of said station to amplifier output whereas the other stations all remain connected to input, and simultaneously reversing the amplifier connections, whereby the transducer of said station connects to said input and the transducers of all other stations connect to said output.

3. An intercommunication system comprising:

a first audio transducer station;

a second audio transducer station;

an amplifier having an input and an output;

switch means having a first position connecting said first audio transducer station to said amplifier input and said second audio transducer to said amplifier output, and a second position connecting said first audio transducer station to said amplifier output and said second audio transducer to said amplifier input;

a contact switch located at said first station;

a first multi-contact relay providing a circuit contact interconnecting said first station transducer to said switch means, and a second multi-contact relay providing a circuit contact interconnecting said second station transducer to said switch means, said first and second relays being series connected through said contact switch to a source of power;

each said relay having a self energizing contact to provide for holding said relays operative once activated by the contact switch; and a drive means for said switch means including a power circuit through a contact of said first multi-contact relay and said contact switch, said drive means connected to drive said switch means from said first position to said second position upon closing of said contact switch, said drive means operable to reverse the switch means when said contact switch is opened.

4. An electrical sub-system for operation of a multistation intercommunication system, comprising:

a first electrical prime mover;

switch means closeable by operation of said prime mover;

primary circuit means including isolation means for blocking direct current, a switch closeable to make a circuit, and conduit means connecting said isolation means and switch in series with said first prime moved and a source of direct current power, said isolation means oriented to permit a flow of current to place said prime mover in operation upon closing of said switch for at least a period of time required for said prime mover to close said switch means;

a second electrical prime mover;

a normally-open secondary circuit means connecting said second electrical prime mover to one side of said source of direct current power through a connection to said primary circuit between said switch and isolation means, said second electrical prime mover connected to the second side of said power source;

a by-pass circuit from a source of direct current power to said first electrical prime mover, said by-pass circuit including a means in said switch means to operate said by-pass circuit upon operation of said first electrical prime mover and thus cause said first prime mover to continue in operation;

said secondary circuit means including a means in said switch means closing said secondary circuit upon operation of said first electrical prime mover; and said isolation means preventing operation of said second electrical prime mover by flow of current through said isolation means from said by-pass operation of said first electrical prime mover.

5. In the system defined in claim 4, the provision of a cancel switch at each station, a power relay switch in the power supply to each said multi-contact relay switch, and circuit means including said cancel switches to activate said power relay, said circuit means including a switch contact of the multi-contact relay associated with a cooperating station, whereby one of the cooperating stations may be employed to cancel the established cooperation relationship of all stations.

6. A multi-station intercommunication system employing the electrical sub-system of claim 4, comprising:

a first audio transducer station;

a second audio transducer station;

an amplifier having an input and an output;

audio switch means having a first position connecting said first audio transducer station to said amplifier input and said second audio transducer to said amplifier output, and a second position connecting said first audio transducer station to said amplifier output and said second audio transducer to said amplifier input;

said first electrical prime mover and switch means located at said first audio transducer station; and said second electrical prime mover being connected to provide power to said audio switch means.

7. A multi-station intercommunication system embodying the definition of claim 6, wherein each station has one said first electrical prime mover and a responsive prime mover also having switch means:

circuit means including a call-button switch located at each station representing every other station in the system, said circuit means and any one call-button switch serving as said switch closeable to make said primary circuit;

said responsive power means of the station represented by said selected call button being incorporated into said primary circuit thus established; and responsive prime mover having a by-pass circuit and switch operated by said responsive prime mover to provide continuous operation after opening of said call-button switch.

References Cited by the Examiner

UNITED STATES PATENTS

| | | | |
|---|---|---|---|
| 2,545,478 | 3/1951 | Levy | 179—1 |
| 2,841,647 | 7/1958 | Blow | 179—1 |
| 3,130,273 | 4/1964 | Noecker | 179—40 |

ROBERT H. ROSE, *Primary Examiner.*